United States Patent [19]

Yokoyama et al.

[11] Patent Number: 4,900,861
[45] Date of Patent: Feb. 13, 1990

[54] METHOD OF PRODUCING POLYSILANE COMPOUNDS

[75] Inventors: Keiichi Yokoyama; Katsuo Taniguchi; Yoshihisa Kiso, all of Iwakuni, Japan

[73] Assignee: Mitsui Petrochemical Industries, Ltd., Tokyo, Japan

[21] Appl. No.: 254,838

[22] Filed: Oct. 7, 1988

[51] Int. Cl.$^4$ .............................................. C07F 7/08
[52] U.S. Cl. ...................................................... 556/430
[58] Field of Search ......................................... 556/430

[56] References Cited

U.S. PATENT DOCUMENTS

| | | | |
|---|---|---|---|
| 3,050,366 | 8/1962 | Ringwald | 556/430 X |
| 4,537,942 | 8/1985 | Brown-Wensley et al. | 556/430 X |
| 4,611,035 | 9/1986 | Brown-Wensley et al. | 556/430 X |
| 4,639,501 | 1/1987 | Seyforth et al. | 556/430 X |

Primary Examiner—Paul F. Shaver
Attorney, Agent, or Firm—Sherman and Shalloway

[57] ABSTRACT

A method of producing polysilane compounds which comprises: polymerizing a monomeric silane compound represented by the general formula of

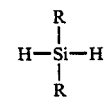

wherein R independently represents hydrogen or hydrocarbon group, but not both R's are hydrogen at the same time, in the presence of an organometallic complex of Ni, Co, Ru, Pd or Ir.

6 Claims, No Drawings

METHOD OF PRODUCING POLYSILANE COMPOUNDS

This invention relates to a method of producing polysilane compounds, and particularly to a method of producing polysilane compounds by the polymerization of a monomeric silane compound in the presence of an organometallic complex.

Polysilane compounds have been given much attention in recent years, for example, for use as a high performance resin such as a highly electroconductive resin, or a photosensitive resin such as a high resolution photoresist, or a precursor material for the production of silicon carbide fibers.

The polysilane compopunds have been heretofore produced by the reaction of dichlorosilane with metallic sodium as is shown below:

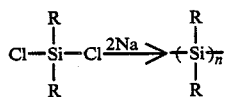  (I)

wherein R each represents hydrogen or hydrocarbon group, but not both R's are hydrogen at the same time. However, as is apparent in the above formula, the method disadvantageously needs two moles of metallic sodium per mole of monomeric silane compound, and the use of metallic sodium in large amounts is not feasible in the industrial production of polysilane compounds since, for example, sodium is readily combustible. Moreover, the thus produced polysilane compound tends to contain chloride ions which adversely affect the electrochemical properties of the polymer.

Thus, there has been proposed in J. Organomet. Chem., 279, C11 (1985) and J. Am. Chem. Soc., 108, 4059 (1986) a new method in which a phenylsilane is polymerized in the presence of an organotitanium complex, as is shown below:

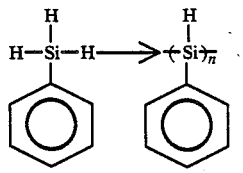  (II)

wherein n is about six. An organozirconium complex has also been found useful as a catalyst, as is disclosed in Can. J. Chem., 64, 1677 (1986).

It is also known, as is described in J. Organometal Chem., 55 (1973), C7–C8, that the heating of a monomeric hydrosilane compound in the presence of an organorhodium complex, (Ph$_3$P)$_3$PhCl, provides oligomers such as dimers or trimers of the hydrosilane together with disproportionation of substituents of silanes in a significant proportion. The disproportion product contaminates the desired polysilane compound, but can not bereadily removed from the polysilane compound.

The present inventors have made an intensive investigation to obviate the problem involved in the production of polysilane compounds as above described, and have now found that an organocomplex of Ni, Co, Ru, Pd or Ir is effective as a catalyst for the polymerization of a monomeric silane compound to produce a higher molecular weight polysilane compound with substantially no by-production of undesired disproportionation products.

Therefore, it is an object of the invention to provide a novel method of producing a polysilane compound.

It is a specific object of the invention to provide a method of producing polysilane compound by the polymerization of a monomeric silane compound in the presence of an organometallic complex of a specific VIII group metal of the periodic table.

In accordance with the invention, there is provided a method of producing a polysilane compound which comprises: polymerizing a monomeric silane compound represented by the general formula of

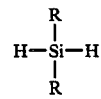

wherein R independently represents hydrogen or hydrocarbon group, but not both R's are hydrogen at the same time, in the presence of an organometallic complex of Ni, Co, Ru, Ir or Pd.

The organometallic complexes used in the invention are those of Ni, Co, Ru, Ir or Pd of the VIII group of the periodic table, among which are particularly preferred organometallic complexes of Ni, Co or Ru.

The ligand in the complex may be halogen, hydrogen, alkyl, aryl, alkylsilane, arylsilane, olefin, alkylcarboxyl, arylcarboxyl, acetylacetonatoalkoxyl, aryloxy, alkylthio, arylthio, unsubstituted or substituted cyclopentadienyl, cyanoalkane, cyanoaromatic hydrocarbon, CN, CO, NO, alkylamine, arylamine, pyridine, alkylphosphine, arylphosphine, or alkylarylphosphone.

Among these are particularly preferred halogen, hydrogen, alkyl, aryl, alkene or alkyne inclusive of ethylene, acetylene, methylacetylene, dimethylacetylene and π-allyl, unsubstituted or substituted cyclopentadienyl, CN, CO, alkylphosphine, arylphosphine, alkylarylphosphine, alkylenediphosphine represented by the general formula of A$_2$-P(CH$_2$)mP-A$_2$ wherein A represents independently alkyl or aryl (e.g., phenyl) and m is 1, 2 or 3, cyclooctadiene and bipyridyl.

Most preferred ligands may be hydrohen, chlorine, methyl, phenyl, ethylene, π-allyl, bipyridyl, triphenylphosphine, CO, dimethylenetetraphenylphosphine and trimethylenetetraphenylphosphine. The metal has these ligands in accordance with the coordination number of the metal permitted, to form organometallic complexes.

More specific examples of the organometallic complexes usable in the invention are given below, in which COD represents cyclooctadiene; Cp, cyclopentadienyl; φ, phenyl; AN, acrylonitrile; dip, bipyridyl; acac,

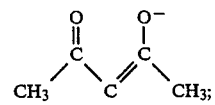

Py, pyridine; Me, methyl, Et, ethyl; and Bu, butyl.
Ni Complexes:
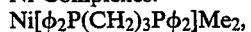
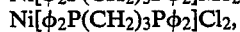
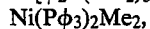
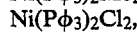
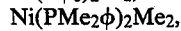

NiEt$_2$,
Ni(CNMe)(CO)$_3$,
Ni(Cp)Cl$_2$,
Ni(Cp)I$_2$,
Ni(Cp)NO,
Ni(CF$_3$C≡CCF$_3$)(CO)$_2$,
Ni(Cp)(CN)$_2$,
Ni(Cp)(CO)I,
Ni($\pi$—CH$_2$=CHCH$_2$)$_2$,
Ni(Cp)(CO)CF$_3$,
Ni(NCCH=CHCN)$_2$,
Ni(Cp)(CO)C$_2$F$_5$,
Ni(cyclooctatetaene)
Ni(Cp)($\pi$—CH$_2$=CHCH$_2$),
Ni(EtNC)$_2$(CN)$_2$,
Ni(MeNC)$_4$,
Ni(Cp)(P$\phi_3$)Cl,
Ni(CH$_2$=CH$_2$)(PEt$_3$)$_2$,
Ni(Cp)(P$\phi_3$)Et,
Ni[$\phi_2$P(CH$_2$)$_2$P$\phi_2$]BrMe,
Ni[$\phi_2$P(CH$_2$)$_3$P$\phi_2$]BrMe,
Ni(CH$_2$=CH$_2$)(P$\phi_3$)$_2$,
Ni(AN)(P$\phi_3$),
($\pi$—CH$_2$=CHCH$_2$NiCl)$_2$,
($\pi$—CH$_2$=CHCH$_2$NiBr)$_2$,
[Ni(Cp)(CO)]$_2$,
[Ni(Cp)]$_2$HC≡CH,
[Ni(Cp)]$_2$HC≡C—CH$_3$,
[Ni(Cp)]$_2$CH$_3$—C≡C—CH$_3$,
Ni(dip)Cl$_2$,
Ni(dip)Br$_2$,
Ni(dip)ClMe,
Ni(dip)Me$_2$,
Ni(dip)Et$_2$,
NiCp$_2$,
Ni(CO)$_4$,
Ni(AN)$_2$,
Ni(acac)$_2$,
Ni[$\phi_2$P(CH$_2$)$_3$P$\phi_2$$\phi$ClMe,
Ni[$\phi_2$P(CH$_2$)$_3$P$\phi_2$]Br$_2$,
Ni[$\phi_2$P(CH$_2$)$_3$P$\phi_2$]Et$_2$,
Ni[$\phi_2$P(CH$_2$)$_3$P$\phi_2$]H$_2$,
Ni(P$\phi_3$)$_2$ClMe,
Ni(P$\phi_3$)$_2$HMe.

Co Complexes:
Co(P$\phi_3$)$_2$Me$_2$,
Co(P$\phi_3$)$_2$Cl$_2$,
Co$_2$(CO)$_8$,
Co[$\phi_2$P(CH$_2$)$_2$P$\phi_2$]Me$_2$,
Co(P$\phi_3$)$_2$Br$_2$,
Co(P$\phi_3$)$_2$BrMe,
Co(P$\phi_3$)$_2$ClMe,
Co(P$\phi_3$)$_2$Et$_2$,
Co[$\phi_2$P(CH$_2$)$_3$P$\phi_2$]Me$_2$,
Co[$\phi_2$P(CH$_2$P$\phi_2$]ClMe,
Co[$\phi_2$P(CH$_2$)$_3$P$\phi_2$]Cl$_2$,
Co[$\phi_2$P(CH$_2$)$_3$P$\phi_2$]ClMe,
Co(CO)$_4$Me,
Co(Cp)Cl$_2$,
Co(Cp)Me$_2$,
Co($\pi$—CH$_2$=CHCH$_2$)(CO)$_3$,
Co(Cp)(CO)$_2$,
Co(Cp)$_2$,
[Co(Cp)$_2$]Br$_3$,
[Co(Cp)$_2$]Cl,
Co(P$\phi_3$)(CO)$_3$Me,
Co(P$\phi_3$)$_2$H$_2$,
Co(P$\phi_3$)$_2$Br$_2$.

Pd Complexes:
Pd(P$\phi_3$)$_2$Me$_2$,
Pd(P$\phi_3$)$_2$Cl$_2$,
Pd(P$\phi_3$)$_2$ClMe,
Pd(P$\phi_3$)$_2$H$_2$,
Pd(P$\phi_3$)$_2$Et$_2$,
Pd(P$\phi_3$)$_2$Br$_2$,
Pd(P$\phi_3$)$_2$BrMe,
Pd(P$\phi_3$)$_2$I$_2$,
Pd(Cp)Br,
Pd(Cp)Cl,
Pd(AN)$_2$Cl$_2$,
Pd ($\pi$—CH$_2$=CHCH$_2$)$_2$,
Pd($\pi$—CH$_2$=CHCH$_2$)$_2$Cl$_2$,
Pd(Cp)($\pi$—CH$_2$=CHCH$_2$),
Pd(COD)Cl$_2$,
Pd(COD)Me$_2$,
Pd(COD)ClMe,
Pd(dip)Me$_2$,
Pd(PEt$_3$)$_2$CNMe,
Pd(PEt$_3$)$_2$Me$_2$,
Pd(p—MeO—C$_6$H$_4$—NC)$_2$Br$_2$,
Pd(Pet$_3$)$_2\phi$Br,
Pd[$\phi_2$P(CH$_2$)$_2$P$\phi_2$]Me$_2$,
Pd[$\phi_2$P(CH$_2$)$_3$P$\phi_2$]Me$_2$,
[Pd($\pi$—CH$_2$=CHCH$_2$)Cl]$_2$,
[Pd($\pi$—CH$_2$=CHCH$_2$)Br]$_2$.

Ru Complexes:
Ru(P$\phi_3$)$_3$Me$_2$,
Ru(P$\phi_3$)$_3$Cl$_2$,
Ru(P$\phi_3$)$_3$ClMe,
Ru(P$\phi_3$)$_3$Br$_2$;
Ru(P$\phi_3$)$_3$Et$_2$,
Ru(P$\phi_3$)$_2$ClMe$_2$,
Ru(P$\phi_3$)$_3$H$_2$,
Ru(Cp)(CO)$_2$H,
Ru(COD)Cl$_2$,
Ru(Cp)(CO)$_2$Me,
Ru(COD)Br$_2$,
Ru(MeNC)$_4$Cl$_2$,
Ru(Cp)(CO)$_2$Et,
Ru(Cp)$_2$,
Ru[$\phi_2$P(CH$_2$)$_2$P$\phi_2$]$_2$ClMe,
Ru[$\phi_2$P(CH$_2$)$_3$P$\phi_2$]$_2$ClMe,
Ru[$\phi_2$P(CH$_2$)$_2$P$\phi_2$]$_2$Cl$\phi$,
Ru(EtNC)$_4$Cl$_2$,
Ru(EtNC)$_4$Br$_2$,
Ru(EtNC)$_4$Me$_2$,
Ru(EtNC)$_4$Et$_2$,
Ru[$\phi_2$P(CH$_2$)$_3$P$\phi_2$]$_2$BrMe,
Ru[$\phi_2$P(CH$_2$)$_2$P$\phi_2$]$_2$HMe,
[Ru(Cp)(CO)$_2$]$_2$.

Ir Complexes:
Ir(P$\phi_3$)$_3$(CO)Me,
Ir(P$\phi_3$(CO)H,
Ir(Cp)(CO)$_2$,
Ir(Cp)$_2$Br$_3$,
Ir(P$\phi_3$)$_3$Me$_2$,
Ir(P$\phi_3$)$_3$Cl$_2$;
Ir(P$\phi_3$)$_3$ClMe,
Ir(P$\phi_3$)$_3$H$_2$,
Ir[$\phi_2$P(CH$_2$)$_2$P$\phi_2$]Me$_2$,
ir[$\phi_2$P(CH$_2$)$_2$P$\phi_2$](CO)Me,
Ir(P$\phi_3$)$_2$(CO)MeClI,
Ir($\pi$—CH$_2$=CHCH$_2$)(P$\phi_3$)$_2$Cl$_2$,
Ir[p—CH$_3$—C$_4$H$_6$—NC)$_4$Cl,
Ir(acac)(COD).

In particular, the following complexes are preferred in the invention.

Ni[$\phi_2$P(CH$_2$)$_2$P$\phi_2$]Me$_2$,
Ni[$\phi_2$P(CH$_2$)$_3$P$\phi_2$]Me$_2$,
Ni[$\phi_2$P(CH$_2$)$_3$P$\phi_2$]Cl$_2$,
Ni(dip)Me$_2$,
Ni(P$\phi_3$)$_2$Me$_2$,
Ni(PMe$_2\phi$)$_2$Me$_2$,
Co(P$\phi_3$)$_2$Me$_2$, and
Ru(P$\phi_3$)$_2$Me$_2$.

The monomeric silane compound used in the invention is represented by the general formula of

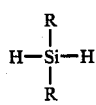

wherein R independently represents hydrogen or hydrocarbon group, but not both R's are hydrogen at the same time.

Preferably, the monomeric silane compound is either alkylsilane, arylsilane, dialkylsilane, diarylsilane or alkylarylsilane, in which the alkyl is of 1–10 carbons and the aryl, preferably of 6–14 carbons, includes, for example, phenyl, a phenylalkyl (e.g., benzyl or phenethyl), an alkylphenyl (e.g., tolyl or xylyl) or a halophenyl (e.g., chlorophenyl or dichlorophenyl).

Thus, the monomeric silane compound used in the invention may be exemplified by alkyl silanes such as methylsilane, ethylsilane, n-propylsilane, isopropylsilane, n-butylsilane, n-pentylsilane, n-hexylsilane or n-heptylsilane; aryl silanes such as phenylsilane, benzylsilane or phenethylsilane; dialkyl silanes such as dimethylsilane, methylethylsilane, diethylsilane, methyl-n-propylsilane, methylisopropylsilane, ethyl-n-propylsilane, ethylisopropylsilane, diisopropylsilane, di-n-butylsilane or di-n-pentylsilane; alkyl aryl silanes such as methylphenylsilane, ethylphenylsilane; or diaryl silanes such as diphenylsilane, phenyl-o-tolylsilane, phenyl-p-tolylsilane, phenyl-m-tolylsilane, phenyl-p-chlorophenylsilane, phenyl-2,4-dimethylphenylsilane or phenyl-2,4-dichlorophenylsilane. The monomeric silane compound may be used singly or as a mixture of two or more. Further, if desired, oligomers, preferably a dimer or a trimer, of the monomeric silane compound may be used in place of the monomeric silane compound or together therewith.

Preferred monomeric silane compounds used in the invention are phenylsilane, methylphenylsilane, diphenylsilane, ethylphenylsilane or n-hexylsilane, with phenylsilane, methylphenylsilane or diphenylsilane most preferred.

According to the invention, the polymerization of the monomeric silane compound in the presence of a selected VIII group organometallic complex as beforedescribed as a catalyst provides polysilane compounds either of linear or branched structures. The structure of the polysilane compound can be determined by proton magnetic resonance spectrometry, ultraviolet absorption spectrometry and mass spectromatry.

The linear structure polysilane compound may be represented by

wherein R is the same as before, and n is an integer of not less than 2, usually in the range of from 2 to 20. In many cases, n is in the range of from 3 to 7 as a result of the analysis of the products obtained in accordance with the method of the invention.

The branched structure polysilane compound has a silane branch through a Si—Si bond in the above formula. An exemplified polysilane compound of the branched structure may be as follows:

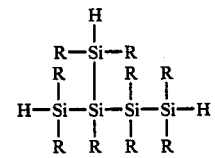

In addition to the linear or branched polysilanes, it is possible that cyclic structure polysilane is produced in part, which may be represented by:

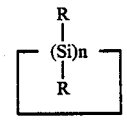

In the method of the invention, the polymerization of the monomeric silane compound is carried out usually at temperatures in the range of from about −20° C. to about 80° C., preferably from about 20° C. to about 50° C. The reacton time may be in the range of from about 10 minutes to 2 days, and preferably from about 1 hour to 1 day, although largely depending upon the reaction temperature employed.

Usually the reaction is carried out in the absence of a solvent, but may be carried out in the presence of a solvent inactive to the reaction, if necessary. The solvent usable includes, for example, aromatic hydrocarbons such as benzene or toluene, ethers such as methyl ethyl ether, diethyl ether, tetrahydrofuran or dioxane, acid amides such as dimethylformamide, or acid esters such as ethyl acetate or butyl acetate.

The VIII group metal complex as a catalyst is used in the reaction usually in amounts of from about 0.0001 mole to about 0.5 moles, preferably from about 0.005 moles to about 0.05 moles, per mole of the monomeric or oligomeric silane compound used.

It is desired that the reaction be carried out under an inert gas atmosphere such as nitrogen or argon. The progress of the reaction is confirmed by evolution of hydrogen gas from the reaction mixture.

According to the invention, the monomeric silane compound polymerizes readily in the presence of a catalytic or very small amount of an organometallic complex of a selected VIII group metal of the periodic table, thereby to provide polysilane compounds in high yields with substantially no by-production of undesired disproportionation products. The catalyst used may be recovered from the reaction mixture, if desired.

The invention will now be fully described with reference to examples, which are, however, illustrative only, and the invention is not limited to the examples.

EXAMPLE 1

(Catalyst Used: Ni[$\phi_2$P(CH$_2$)$_3$P$\phi_2$]Me$_2$)

To a suspension of 0.13 g (0.24 millimole) of Ni[$\phi_2$P(CH$_2$)$_3$P$\phi_2$]Cl$_2$ in ether (1 ml) were added dropwise 0.5 ml of an ether solution of methyl lithium (1 mole/l, 0.5 millimole) at −20° C. under a nitrogen atmosphere, and then the mixture was raised to 0° C., followed by stirring over 1 hour. During the stirring, the red brownish organonickel complex crysyals were dissolved, and then solids precipitated out, to provide an yellow suspension in which a dimethyl complex, Ni[$\phi_2$P(CH$_2$)$_3$P$\phi_2$]Me$_2$ produced was dissolved.

An amount of 0.5 ml of the suspension was taken out with a syringe and added to phenylsilane (1.4 g, 13 millimole, colorless liquid, bp. 60°-62° C.) at room temperatures. The amount of the catalyst used was 0.01 mole per mole of phenylsilane used. The reaction mixture evolved gases markedly while it turned brown. The gas evolution continued markedly for about 5-10 minutes, and thereafter continued mildly.

After the reaction over 5 hours, low temperature boiling substances were removed by distillation under reduced pressures, to provide 1.34 g of a viscous oily material. The yield was found 97% based on the phenylsilane used.

The spectral data of the material are as follows, and based thereon the material was found polyphenylsilane composed of tetramers and pentamers in an about 80/20 weight ratio. FD-Ms: 532 (M$^+$ of pentamers, 20), 426 (M$^+$ of tetramers, 100).

$^1$H-NMR (δ): 4.38 (m, 6H), 7.25 (m, 20H).

UV (THF, nm): 210, 240(sh), 270(sh).

EXAMPLES 2-8

The polymerization of phenylsilane was carried out using a catalyst shown in Table 1 in amounts of 0.01 mole per mole of phenylsilane used and otherwise in the same manner as in Example 1. The yields of the polysilanes obtained are shown in Table 1.

TABLE 1

| Examples | Catalysts Used | Yields (%) |
|---|---|---|
| 2 | Ni(P$\phi_3$)$_2$Me$_2$ | 50 |
| 3 | Ni(dip)Cl$_2$ | 49 |
| 4 | Ni(PMe$_2\phi$)$_2$Me$_2$ | 70 |
| 5 | Co(P$\phi_3$)$_2$Me$_2$ | 72 |
| 6 | Pd(P$\phi_3$)$_2$Me$_2$ | 10 |
| 7 | Ru(P$\phi_3$)$_3$Me$_2$ | 80 |
| 8 | Ir(P$\phi_3$)$_3$(CO)Me | 10 |

EXAMPLE 9

(Catalyst Used: Ni[$\phi_2$P(CH$_2$)$_3$P$\phi_2$]Cl$_2$)

An amount of 0.05 g (0.10 millimole) of Ni[$\phi_2$P(CH$_2$)$_3$—P$\phi_2$]Cl$_2$ was mixed with 1.08 g (10 millimole) of phenylsilane at room temperatures under a nitrogen atmosphere. Gases were gradually evolved while the mixture turned brown. After stirring at room temperatures over 5 hours, low temperature boiling substances were removed by distillation under reduced pressures, to provide 0.96 g of a viscous oily material. The yield was found 90%.

The spectral data of the material are as follows. FD-Ms: 743 (M$^+$ of heptamers, 29), 636 (M$^+$ of hexamers, 40), 532 (M$^+$ of pentamers, 63), 426 (M$^+$ of tetramers, 100), 320 (M$^+$ of trimers, 34).

EXAMPLES 10-13

The polymerization of phenylsilane was carried out using a catalyst shown in Table 2 in amounts of 0.01 mole per mole of phenylsilane used and otherwise in the same manner as in Example 9. The yields of the polysilanes obtained are shown in Table 2.

TABLE 2

| Examples | Catalysts Used | Yields (%) |
|---|---|---|
| 10 | Ni(P$\phi_3$)$_2$Cl$_2$ | 32 |
| 11 | Co$_2$(CO)$_8$ | 24 |
| 12 | Pd(P$\phi_3$)$_2$Cl$_2$ | 14 |
| 13 | Ir(P$\phi_3$)$_3$(CO)H | 24 |

EXAMPLES 14 AND 15

The polymerization of methylphenylsilane was carried out using a catalyst shown in Table 3 in amounts of 0.01 mole per mole of methylphenylsilane used and otherwise in the same manner as in Example 1. The yields of the polysilanes are shown in Table 3.

TABLE 3

| Examples | Catalysts Used | Yields (%) |
|---|---|---|
| 14 | Ni[$\phi_2$P(CH$_2$)$_3$P$\phi_2$]Me$_2$ | 22 |
| 15 | Ni[$\phi_2$P(CH$_2$)$_2$P$\phi_2$]Me$_2$ | 50 |

What is claimed is:

1. A method of producing polysilane compounds which comprises: polymerizing a monomeric silane compound represented by the general formula of

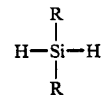

wherein R independently represents hydrogen or hydrocarbon group, but not both R's are hydrogen at the same time, in the presence of an organometallic complex of Ni, Co, Ru, Pd or Ir.

2. The method as claimed in claim 1 wherein the organometallic complex has ligands selected from the group consisting of halogen, hydrogen, alkyl, aryl, olefin, cyclopentadienyl, CN, CO, alkylphosphine, arylphosphine, alkylenediphosphine, cyclooctadiene and bipyridyl in accordance with the coordination number of the metal permitted.

3. The method as claimed in claim 1 wherein the organometallic complex is Ni[$\phi_2$P(CH$_2$)$_2$P$\phi_2$]Me$_2$, Ni[$\phi_2$P(CH$_2$)$_3$P$\phi_2$]Me$_2$, Ni[$\phi_2$P(CH$_2$)$_3$P$\phi_2$]Cl$_2$, Ni(dip)Me$_2$, Ni(P$\phi_3$)$_2$Me$_2$, Ni(PMe$_2\phi$)$_2$Me$_2$, Co(P$\phi_3$)$_2$Me$_2$ or Ru(P$\phi_3$)$_2$Me$_2$.

4. The method as claimed in claim 1 wherein the organometallic complex is used in amounts of from about 0.0001 mole to about 0.5 moles per mole of the monomeric silane compound used.

5. The method as claimed in claim 1 wherein the monomeric silane compound is phenylsilane.

6. The method as claimed in claim 1 wherein the monomeric silane compound is methylphenylsilane.

* * * * *

UNITED STATES PATENT AND TRADEMARK OFFICE
CERTIFICATE OF CORRECTION

PATENT NO. : 4,900,861

DATED : February 13, 1990

INVENTOR(S) : KEIICHI YOKOYAMA ET AL.

It is certified that error appears in the above-identified patent and that said Letters Patent is hereby corrected as shown below:

On the Cover Page of the patent, the following information should be inserted:

--Foreign Application Priority Data
Oct. 9, 1987 [JP] Japan ...... 62-255089--.

Signed and Sealed this

Seventh Day of May, 1991

Attest:

HARRY F. MANBECK, JR.

Attesting Officer

Commissioner of Patents and Trademarks